United States Patent [19]
Zoiss et al.

[11] Patent Number: 5,755,590
[45] Date of Patent: May 26, 1998

[54] LINE CORD STRAIN RELIEF ATTACHMENT FOR TELEPHONE TEST SET

[75] Inventors: Edward J. Zoiss, Moorpark, Calif.; Joseph E. Gleason, Eagan, Minn.; Linda Hathorn, Camarillo; Roy L. Soto, Moorpark, both of Calif.

[73] Assignee: Harris Corporation, Melbourne, Fla.

[21] Appl. No.: 754,075

[22] Filed: Nov. 20, 1996

[51] Int. Cl.⁶ ................................................. H01R 13/58
[52] U.S. Cl. .................................................. 439/455
[58] Field of Search ............................... 439/449, 455, 439/453, 370, 470

[56] References Cited

U.S. PATENT DOCUMENTS 3,390,375  6/1968  Salmonson ........................... 439/470
5,391,092  2/1995  Sumida ................................. 439/470

Primary Examiner—Neil Abrams
Assistant Examiner—Katrina Davis
Attorney, Agent, or Firm—Charles E. Wands

[57] ABSTRACT

A strain relief attachment for attaching a telephone communication cord to a telephone test set has a line cord strain relief element, a grooved neck end of which is insertable through a tunnel through an end of the test set to a strain relief engagement cavity adjacent to a battery compartment of the test set and accessible by a battery door. The strain relief element includes a bore through which the line cord extends and a flange configured to conform with an external surface of the test set adjacent to the tunnel. The strain relief element engagement cavity is connected by a line cord passageway to the battery compartment. A wedge-shaped line cord retention plug is inserted into the strain relief engagement cavity, engaging the grooved neck of the line cord strain relief element and a wall surface of the strain relief engagement cavity. As the wedge-shaped line cord retention plug is inserted into the cavity, it draws the line cord strain relief element into the test set, urging the flange of the line cord strain relief element into sealing engagement with the external surface of the test set.

16 Claims, 5 Drawing Sheets

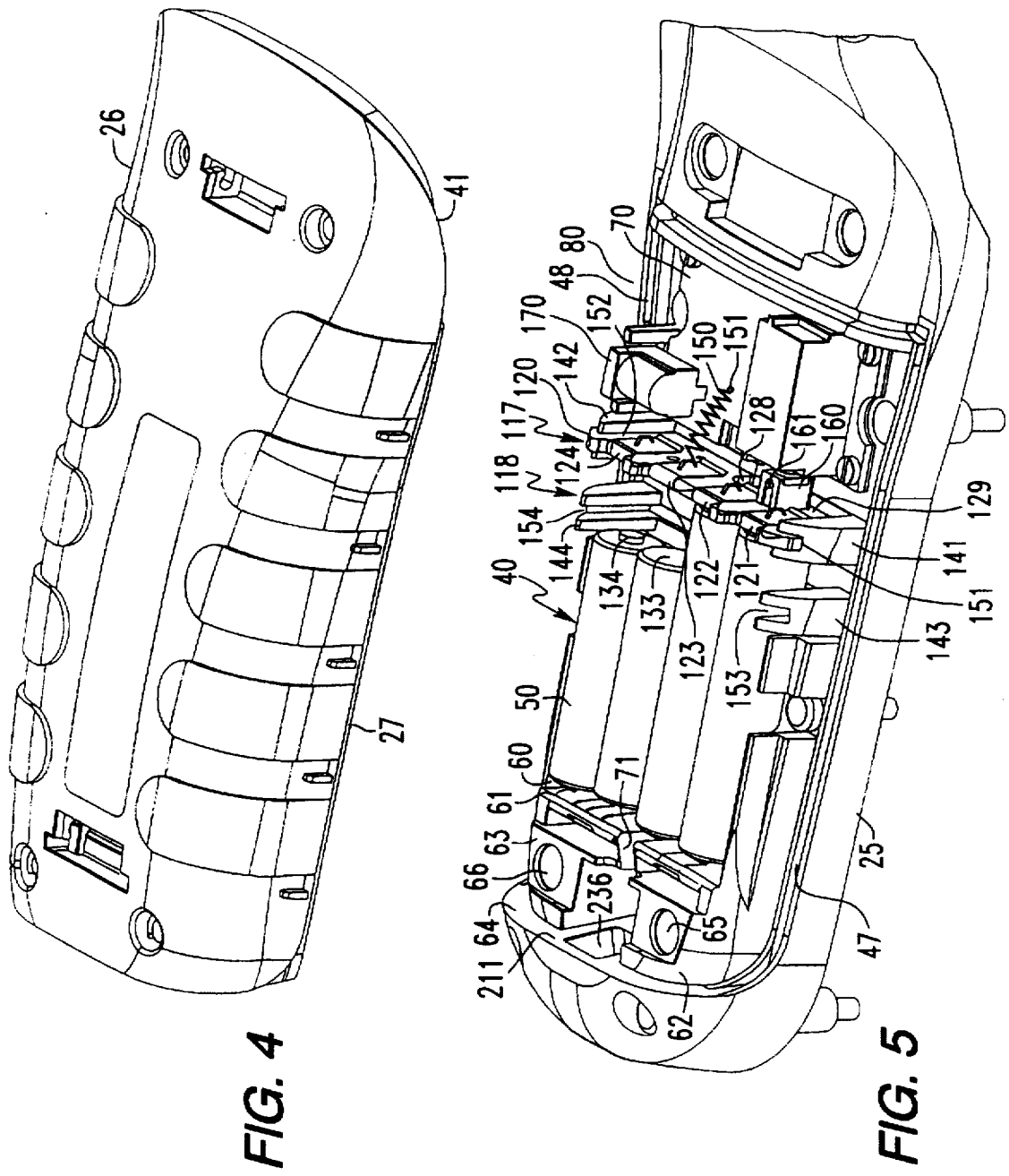

LINE CORD STRAIN RELIEF ATTACHMENT FOR TELEPHONE TEST SET

CROSS-REFERENCE TO RELATED APPLICATIONS

The present application relates to subject matter disclosed in coincidentally filed U.S. patent applications: Ser. No. 08/754,076, entitled "Variable Geometry Battery Compartment for Accommodating Different Sized Batteries in Telephone Craftsperson's Test Set," by E. Zoiss et al; Ser. No. 08/754,077, entitled "Telephone Test Set Keypad with Integrated Microphone," by E. Zoiss et al; and Ser. No. 08/753,101, entitled "Telephone Test Set LCD Panel Carrier," by E. Zoiss et al; and U.S Design Patent application Ser. No. 29/061,617, entitled: "ISDN Test Set," by Roy Soto et al, filed Oct. 28, 1996, which is a continuation-in-part of U.S Design Patent application Ser. No. 29/053,246, entitled: "ISDN Test Set," by Roy Soto et al, filed Apr. 18, 1996, each of the above applications being assigned to the assignee of the present application and the disclosures of which are herein incorporated.

FIELD OF THE INVENTION

The present invention relates in general to portable telecommunication devices, such as telephone test sets, and is particularly directed to a line cord strain relief attachment that facilitates replacement of the line cord and provides a secure strain-relieving, weatherproof seal at the external juncture of the line cord with the body of the test set.

BACKGROUND OF THE INVENTION

Telecommunication devices, including but not limited to portable communication devices, such as telephone craftsperson's test sets, are typically equipped with a wireline communication link, through which a device may be physically and electrically connected with a telecommunication port of another piece of equipment. As a non-limiting example, in the case of a standard telephone device, such a wireline communication link may comprise a section of multi-wire cable, opposite ends of which are equipped with respective RJ45 style modular plugs for releasably mating with a RJ45 telephone jack of the device and that of a network installation, respectively. In the case of a telephone test set, the line cord will also usually include a second multi-wire cable, one end of which is terminated at an RJ45 style modular plug mounted with the internal circuitry of the test set, and the other end of which is provided with a separate a set of (alligator) clips for enabling the test set to be coupled to a variety of connection points of a telephone network.

To provide strain relief for the connection of line cord with the telecommunication device, it is standard practice to employ a jack attachment interface having a serpentine or tortuous path for the line cord. While such a strain relief interface provides some protection for the line cord attachment of a consumer telephone device, it is wholly inadequate for a device, such as a telephone test set, which will be exposed to a variety of physical hazards, including severe physical handling and the environment. This not mandates a strain relief configuration, that is more robust and provides a barrier against the entry of moisture and foreign matter, but one which facilitates replacement of the line cord.

SUMMARY OF THE INVENTION

In accordance with the present invention, this problem is successfully addressed by a new and improved sealed, line cord strain relief attachment, which is integrated into the battery compartment of the device, so as to facilitate access to and replacement of the line cord, without having to tamper with or otherwise interfere with the main cavity of the test set. For this purpose, the strain relief line cord attachment of the present invention comprises a line cord strain relief engagement cavity formed within the battery compartment. Front walls of the cavity have a slot through which the line cord extends onto the floor of the battery compartment, passing through spaces under the batteries. The fixed battery contact wall has a gap that allows the line cord to pass through the fixed battery contact wall to a second portion of the battery compartment containing a printed wiring board.

The cavity communicates with an exterior surface of the test set body through a generally rectangular tunnel sized to snugly receive a generally rectangular solid-shaped line cord strain relief element. A first end of the line cord strain relief element has a grooved neck that is insertable into the cavity, that is configured to be captured by a complementary configured slot of a wedge-shaped line cord retention plug. The surface of the grooved neck of the strain relief element is tapered relative to the rear wall of the cavity, so that insertion of the line cord retention plug causes the line cord strain relief element to be drawn into the body of the test set, thereby urging a flange of the line cord strain relief element against the exterior surface of the test set, providing a tight weatherproof seal around the tunnel.

Projecting from the flange of the line cord strain relief element is a generally cylindrically shaped shroud section having a longitudinal bore which is sized to snugly receive the line cord so that the shroud section provides weatherproof seal around the line cord as it extends through the strain relief element and into the test set. To replace the line cord, the cord retention plug is removed from the cavity by means of a screwdriver or the like, so that the retention plug becomes detached from the grooved neck of the strain relief element. This frees the neck end of the strain relief element, so it may be pulled out of the tunnel thereby allowing the old line cord to be fully removed from the test set, and a new line cord inserted.

BRIEF DESCRIPTION OF THE DRAWINGS

FIG. 4 is a perspective view of the battery door of the test set of FIGS. 1-3;

FIG. 5 is partial perspective view showing the battery compartment portion of a main housing section of the test set of FIGS. 1-4;

DETAILED DESCRIPTION

FIGS. 1-8 diagrammatically illustrate a telephone craftsperson's test set generally configured as described and illustrated in the above-referenced applications, and having a battery compartment that is configured to incorporate the line cord strain relief attachment of the present invention. It should be observed, however, that the invention is not limited to use with only a craftsperson's test set or one configured as detailed in the above-referenced copending applications, but may be installed in other types of communication devices, including but not restricted to those mentioned previously.

Figure 1:
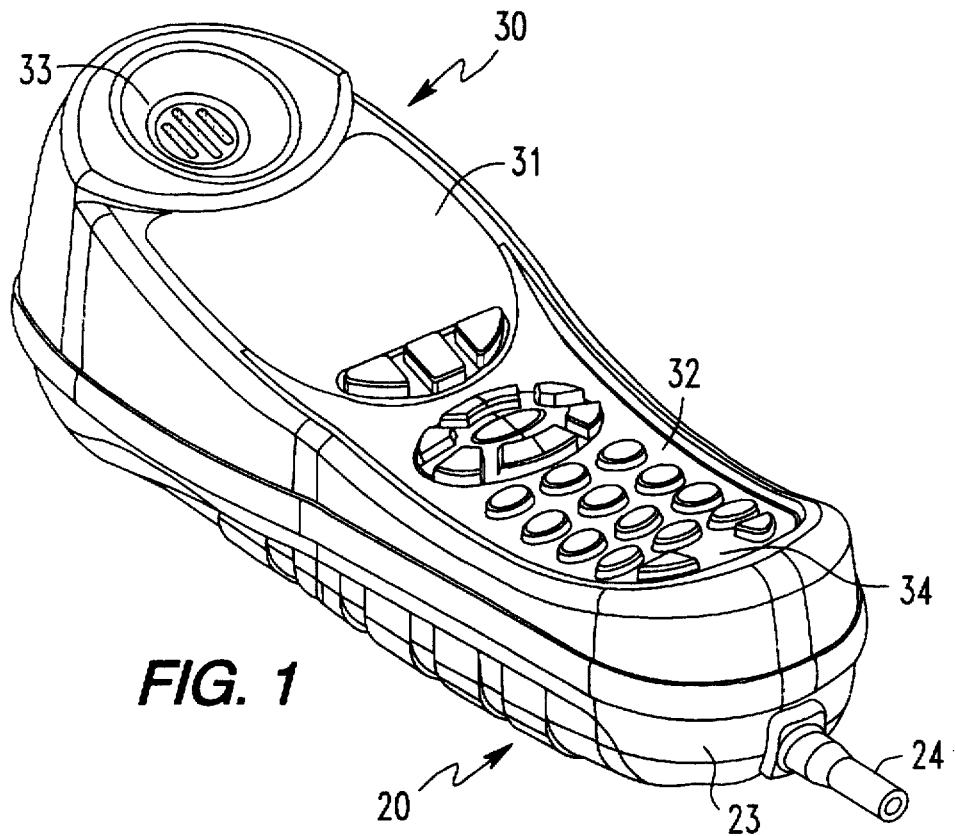
FIG. 1 is a perspective view showing the keypad face of a telephone craftsperson's test set described and illustrated in the above-referenced applications.
Figure 2:
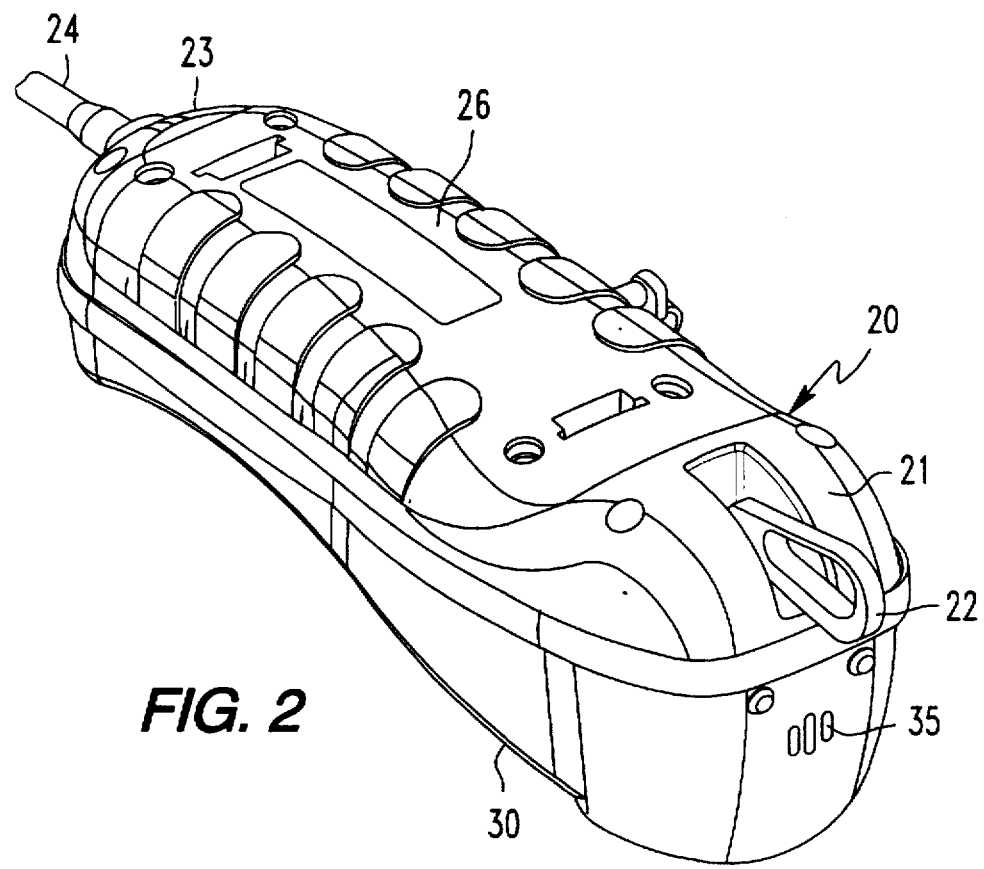
FIG. 2 is a perspective view showing the battery cover portion of the test set of FIG. 1.
Figure 3:
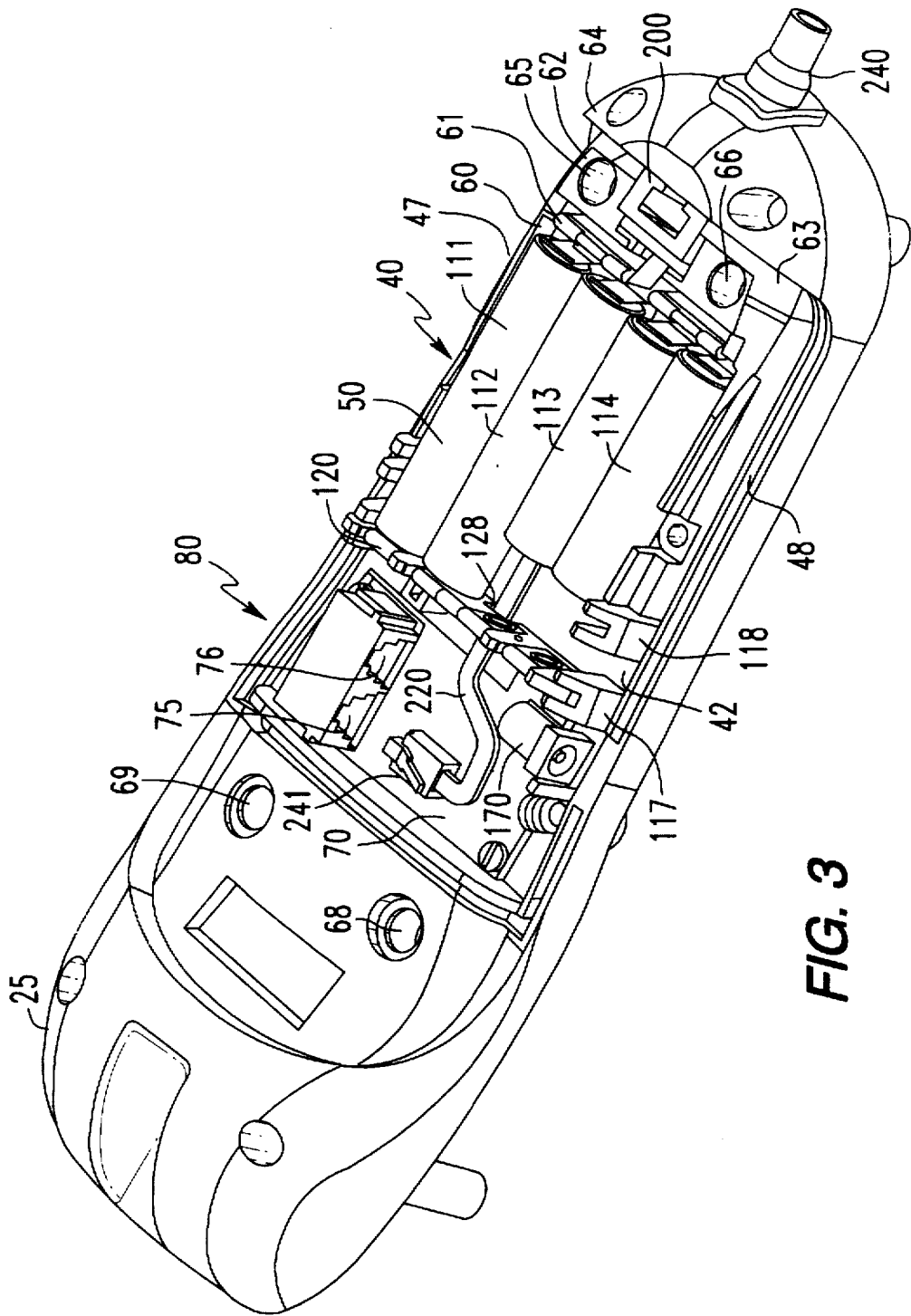
FIG. 3 is a perspective view showing the battery compartment portion of a main housing section of the test set of FIGS. 1 and 2.
Figure 6:
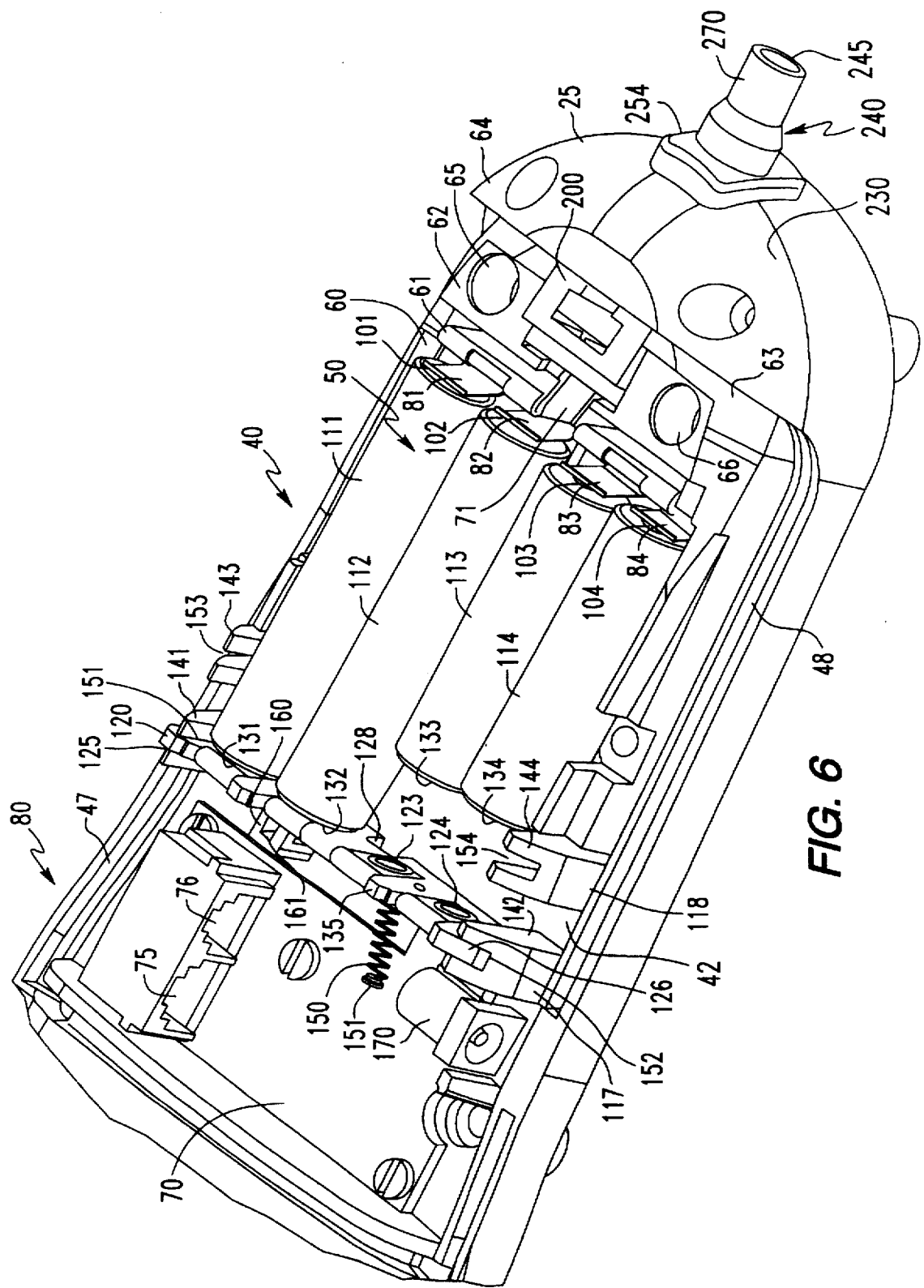
FIG. 6 is an enlarged partial perspective view of FIG. 3.
Figure 8:
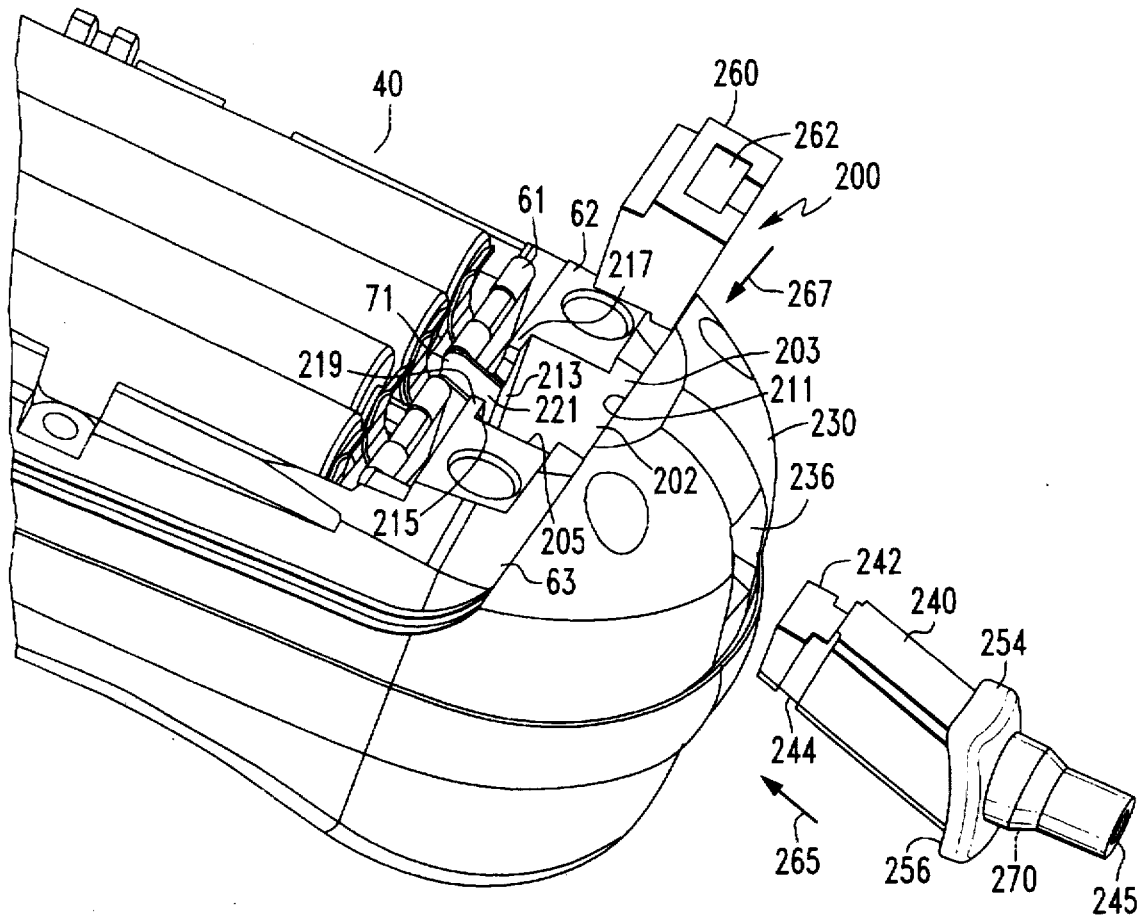
FIG. 8 is enlarged partial perspective view of the line cord strain relief attachment of the invention.
Figure 7:
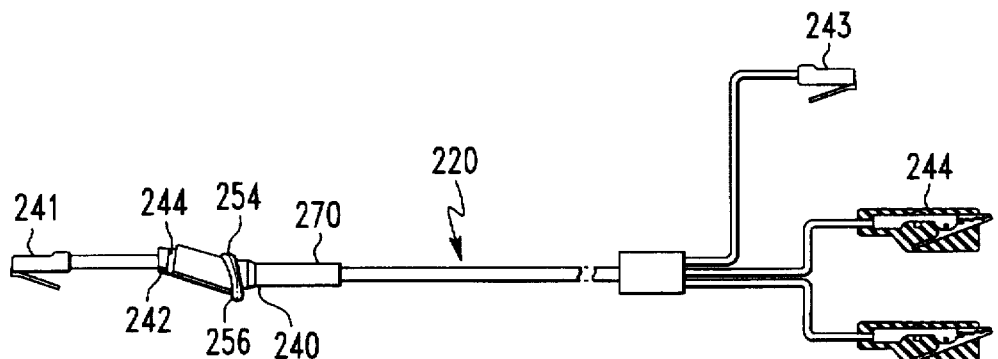
FIG. 7 diagrammatically shows a line cord terminated at its opposite ends with RJ45 style modular plugs and alligator clips.

Of FIGS. 1–8, FIG. 1 is a perspective view showing the keypad face of the test set, FIG. 2 is a perspective view showing the battery cover portion of the test set, FIG. 3 is a perspective view showing the battery compartment portion of a main housing section of the test set, FIG. 4 is a perspective view of the battery door, FIG. 5 is partial perspective view showing the battery compartment portion of a main housing section of the test set, FIG. 6 is an enlarged partial perspective view of FIG. 3, FIG. 7 diagrammatically shows a line cord terminated at its opposite ends with RJ45 style modular plugs and alligator clips, and FIG. 8 is enlarged partial perspective view of the line cord strain relief attachment of the invention.

As shown in FIGS. 1 and 2, the craftsperson's test set of the present example comprises a multi-section rear housing portion 20 and a front housing portion 30. The rear housing portion 20 has a first top end 21, to which a craftsperson's belt clip 22 is attached, and a second or bottom end 23 having a communication cord access port 24. The front housing portion 30 has a front face 31 containing a keypad 32, a receiver grill 33 and a microphone grill 34, and an end portion containing a speaker grille 35.

As shown in greater detail in FIGS. 3–8, the multi-section rear housing portion 20 has a main housing section 25, and a battery compartment cover section or door 26, which is conformal with and completes the exterior housing surface of the rear housing portion. The main housing section 25 is configured to mate with the front housing portion 30, and has a battery compartment 40. The battery compartment 40 is closed along a peripheral portion 41 of the battery door 26, by means of respective ridge regions 27 and 28 of the battery door 26 which are removably engageable with respective grooves 47 and 48 of the main housing section.

The battery compartment 40 is sized to accommodate a plurality of batteries 50 (e.g., four, as a non-limiting number) at a first portion 60 thereof, and a printed wiring board 70 at a second portion 80 adjacent to the first portion 60. For this purpose, the first portion 60 of battery compartment 40 contains a fixed battery contact wall 61 disposed adjacent to a pair of land portions 62 and 63 at a first end 64 of the battery compartment 40. Land portions 62 and 63 have respective circular recesses 65 and 66, which are configured to mate with cylindrical stand-offs molded into interior surface of the battery door 26. Similarly, a sloped land portions 67 adjacent to the second portion 80 of the battery compartment has circular recesses 68 and 69, which are configured to mate with respective cylindrical stand-offs molded into the interior surface of the battery door.

The fixed battery contact wall 61 has a plurality of battery contacts (four in the example shown, at 81, 82, 83 and 84) that are arranged to engage first terminals 101, 102, 103 and 104 of respective batteries 111, 112, 113 and 114. Although the Figures show batteries 111 and 112 being longer than batteries 113 and 114, in reality, it is to be understood that each of the four installed batteries is of the same length. As a non-limiting example, the longer batteries 111 and 112 may correspond to rechargeable (1–½ AA NiCad) batteries, while the shorter batteries 113 and 114 may correspond to (AA alkaline) non-rechargeable batteries. Batteries of different lengths are shown simply for purposes of using the same figure to illustrate two alternative battery types in the variable geometry battery compartment.

The battery compartment 40 further includes a moveable battery contact wall 120, which is positionable at different locations 117, 118 spaced apart from the fixed wall 61 by respectively different distances associated with dimensions of the batteries 111/112 and 113/114. Like the fixed battery contact wall 61, the moveable battery contact wall 120 contains a plurality of battery contacts 121, 122, 123 and 124 that engage second terminals 131, 132, 133 and 124 of the batteries 111, 112, 113 and 114. A plurality of wall-retention receptacles 141, 142, 143 and 144 are disposed at the spaced apart locations of the battery compartment 40. The receptacles 141–144 are configured as standoffs molded into the main housing section 25, and have respective slots 151, 152, 153 and 154 which capture opposite ends 125 and 126 of the moveable battery contact wall 120. A power connection to the internal circuitry of the test set is provided by way of a flexible battery cable 150, which is connected between the battery contacts 121–124 of the moveable battery contact wall and a power supply terminal pad 151 on the printed wiring board 70. The use of a flexible battery cable 150 serves to accommodate the different locations at which the moveable wall 120 is positionable.

To securely retain the moveable contact wall 120 in either of its two installed positions (between receptacle pair 141/142 or between receptacle pair 143/144), the interior surface of the battery door 26 has a pair of molded channels which receive a top edge portion 135 of the moveable contact wall 120. The interior surface of the battery door 26 also contains a plurality of circularly grooved ribs which are sized and located to retain the batteries in their installed positions between the fixed battery contact wall 61 and the moveable battery contact wall 120.

The moveable battery contact wall 120 further includes a generally inverted U-shaped recess 128 at a lower portion thereof facing the floor 42 of the battery compartment, which provides a path for a line cord 220 from a line cord s train relief attachment 200, to be described, to a selected one of a pair of RJ45 style modular jacks 75 and 76 on the printed wiring board 70. This line cord path further includes the gap 71 in the fixed battery contact wall 61 and the battery compartment floor 42 under adjacent ones of the batteries.

Within the test set, selected wires of the line cord 220 are terminated by means of a first RJ45 style modular plug 241 that plugs into one of the RJ45 style modular jack 75 and the second RJ45 modular jack 76. As shown in FIG. 7, at the opposite end of the line cord 220 selected conductors thereof are terminated at an RJ45 plug 243, while the remaining pair of wires is terminated by means of set of (alligator) clips 244, 245 used by the craftsperson to directly bridge the test set to any accessible location of a telephone network, where an RJ45 connection is not available to the circuit of interest.

As shown in greater detail in the enlarge partial perspective view of FIG. 8, the line cord strain relief attachment 200 comprises a line cord strain relief engagement cavity 202 formed between a pair of generally flat sidewalls 203 and 205 of the spaced apart land portions 62 and 63 of the battery compartment 40. The geometry of cavity 202 is further defined by a rear wall 211 and a pair of spaced apart front walls 213 and 215 of projections 217 and 219 of the land portions 62 and 63, respectively. The front walls 213 and 215 of the cavity 202 have a slot 221 through which the line cord extends onto the battery compartment floor 42 under the batteries. Similarly, the fixed battery contact wall 61 has a gap 71 corresponding to the slot 221 between the land portions 62 and 63. The gap 71 in the fixed battery contact wall 61 allows the line cord 220 to pass through the fixed battery contact wall 61 to a second portion 80 of the battery compartment containing printed wiring board 70.

Line cord strain relief engagement cavity 202 communicates with an exterior surface 230 of the test set body by means of a tunnel 236, having a generally rectangular cross section to prevent rotation of and sized to snugly receive a generally rectangular solid-shaped line cord strain relief element 240. Strain relief element 240 is comprised of a suitable flexible and waterproof material, such as neoprene rubber, as a non-limiting example. A first end 242 of the line cord strain relief element 240 has a notched or grooved neck 244 that is insertable into the cavity 202. The surface of the grooved neck 244 of the strain relief element 240 is non-parallel with the planar surface of the rear wall of the cavity 202, so that the application of a force along the grooved neck by way of a wedge-shaped line cord retention plug 260, to be described, will cause the line cord strain relief element 240 to be drawn into the body of the test set, thereby urging a surface 256 of a flange or lip 254 of the line cord strain relief element 240, which is configured to generally conform with the exterior surface 230 of the test set body, against the exterior surface 230 of the test set, and providing a tight weatherproof seal around the tunnel 236.

Namely, the distance between flange 254 and the grooved neck 244 of the strain relief element 240 is defined such that insertion of retention plug 260, as it engages the grooved neck 244 of the strain relief element 240, into the cavity 202, will cause the line cord strain relief element 240 to be drawn or urged into the tunnel 236, and bring the flange 254 tight against the exterior surface 230. Projecting from flange 254 is a generally cylindrically shaped shroud section 270. Strain relief element 240 also has a longitudinal bore 245 which is sized to snugly receive the line cord 220, so that the shroud section 270 provides weatherproof seal around the line cord as it extends through the strain relief element and into the test set.

In order to releasably secure the strain relief element 240 to the test set, the generally wedge-shaped line cord retention plug 260 is preferably made of a hard plastic material, and has a generally rectangular T-shaped slot 262 therethrough, which conforms with the grooved neck 244 of the line cord strain relief element 240. These mutually conforming shapes of the T-shaped slot 262 within retention plug 260 and the grooved neck 244 of the strain relief element 240 enable the retention plug 260 to capture the strain relief element 240, as retention plug 260 is inserted into the line cord strain relief engagement cavity 202.

More particularly, with the battery door 26 removed, access is provided to the battery compartment 40 and the line cord strain relief engagement cavity 202. Further, the batteries are removed and the moveable wall 120 is lifted out of the way. The grooved neck end 244 of the strain relief element 240, from which the first end of the line cord 220 (having the pair of RJ45 modular plugs 241 and 242) extends, is then inserted from outside of the test set body through the tunnel 236 and into the line cord strain relief engagement cavity 202, as shown by arrow 265 in FIG. 8. The first end of the line cord 220 is fed through the slot 71 in the fixed battery wall 61 across the battery floor and the moveable wall is placed in one of the receptacle pairs 141/142 and 143/144, so that the line cord is accommodated with the recess 128 of the moveable battery contact wall 120. This allows the RJ45 style modular plug 241 to be plugged into a selected one of RJ45 style modular jacks 75 and 242, respectively.

The cord retention plug 260 is then inserted into the cavity 202, as shown by arrow 267, so that the grooved neck 244 of the strain relief element 240 is captured within the T-shaped neck of the cord retention plug 260. Because of the wedge shapes of the cavity 202 and the cord retention plug 260, pushing the retention plug 260 deeper into the cavity 202 will cause the line cord strain relief element 240 to be drawn or urged into the body of the test set, thereby tightening the surface 256 of the flange 254 of the line cord strain relief element 240 against the exterior surface 230 of the test set, and providing a weatherproof around the tunnel 236.

To replace the line cord 220, the cord retention plug 260 is readily removed from the cavity 202, by means of a screwdriver or the like, so that the retention plug becomes detached from the grooved neck 244 of the strain relief element 240, and removed from the cavity 202. This frees the neck end 242 of the strain relief element 240, so that it may be pulled out of the tunnel 236, thereby allowing the line cord 220 to be fully removed from the test set.

As will be appreciated from the foregoing description, the shortcomings of conventional line cord strain relief interface arrangements, particularly those used for consumer telephone devices, which are inadequate for telephone test sets (that not only a considerably more robust strain relief, and a barrier against moisture and foreign matter, but should facilitate replacement of the line cord), are effectively remedied by the sealed, line cord strain relief attachment configuration of the present invention, which is integrated into the battery compartment of the device, so as to facilitate access to and replacement of the line cord, without having to tamper with or otherwise interfere with the main cavity of the test set.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed:

1. A strain relief attachment for attaching an electrical line cord to a utility device, said utility device having an aperture in a body thereof, said electrical line cord passing through said aperture for engagement with an electrical connector at a location within said utility device comprising:

a line cord strain relief element, having a neck that is insertable through said aperture in said body of said utility device, said strain relief element including a passageway through which said line cord extends and a lip which is configured to generally conform with an external surface of said body of said utility device adjacent to said aperture;

a strain relief element engagement cavity within said utility device; and a line cord retention plug inserted into said strain relief engagement cavity and engaging said neck of said line cord strain relief element, so as to draw said line cord strain relief element into said body of said utility device and thereby urge said lip of said line cord strain relief element into sealing engagement with said external surface of said body of said utility device.

2. A strain relief attachment according to claim 1, wherein said neck of said line cord strain relief element and said line cord retention plug have complementarily configured, mutually engaging surfaces.

3. A strain relief attachment according to claim 1, wherein said line cord retention plug has a slot configured to engage said neck and a surface which engages a wall of said strain relief engagement cavity, such that as said line cord retention plug is inserted into said strain relief element engagement cavity, engaging said neck of said line cord and said wall of said strain relief engagement cavity, said line cord strain relief element is drawn into said body of said utility device, thereby urging said lip of said line cord strain relief element into sealing engagement with said external surface of said body of said utility device.

4. A strain relief attachment according to claim 1, wherein said line cord strain relief element is generally rectangular-configured, and wherein said aperture through said utility device comprises a generally rectangular-configured tunnel sized to snugly receive said generally rectangular solid-shaped line cord strain relief element, and wherein said neck of the strain relief element is tapered relative to the rear wall of said cavity, so that insertion of said line cord retention plug causes said line cord strain relief element to be drawn into said utility device.

5. A strain relief attachment according to claim 3, wherein said utility device comprises a telephone test set.

6. A strain relief attachment according to claim 5, wherein said strain relief engagement cavity is formed within a battery compartment of said test set.

7. A strain relief attachment according to claim 6, wherein said battery compartment has walls between which batteries for powering said test set are installed, said walls having openings for said line cord as said line cord passes under said batteries to said electrical connector terminating an end of said line cord.

8. A strain relief attachment according to claim 4, wherein said line cord strain relief element further includes a shroud having a longitudinal bore sized to snugly receive said line cord, so that said shroud section provides weatherproof seal around the line cord as it extends through said strain relief element and into said test set.

9. A strain relief attachment for attaching a telephone communication cord to a telephone test set, said telephone test set having an aperture through which said communication cord passes for engagement with a connector installed within said test set comprising:

a line cord strain relief element, having a grooved neck that is insertable through said aperture of said test set, said strain relief element including a bore through which said line cord extends and a flange configured to generally conform with an external surface of said test set adjacent to said aperture;

a strain relief element engagement cavity connected by a line cord passageway to a battery compartment of said test set; and a line cord retention plug inserted into said strain relief engagement cavity and engaging said grooved neck of said line cord strain relief element and a wall surface of said cavity in such a manner as to draw said line cord strain relief element into said test set and thereby urge said flange of said line cord strain relief element into sealing engagement with said external surface of said test set.

10. A strain relief attachment according to claim 9, wherein said neck of the strain relief element is tapered relative to said wall of said cavity, so that insertion of said line cord retention plug causes said line cord strain relief element to be drawn into said test set.

11. A strain relief attachment according to claim 10, wherein said battery compartment has walls between which batteries for powering said test set are installed, said walls having openings for said line cord as said line cord passes under said batteries to said electrical connector terminating an end of said line cord.

12. A strain relief attachment according to claim 9, wherein said line cord strain relief element further includes a shroud having a longitudinal bore sized to snugly receive said line cord, so that said shroud section provides weatherproof seal around the line cord as it extends through said strain relief element and into said test set.

13. A strain relief attachment for attaching a communication line cord to a communication device having a strain relief element capture tunnel, in which a line cord strain relief element is installed for engagement with an electrical connector installed within said communication device, comprising:

a strain relief element engagement cavity formed in said communication device and being accessible by way of a battery compartment closure, and coupled to said strain relief element capture tunnel;

a line cord strain relief element insertable through said capture tunnel of said test set and including a bore through which said line cord extends, and a portion wider than said tunnel and configured to generally conform with an external surface of said communication device adjacent to said aperture; and a line cord retention plug inserted into said strain relief engagement cavity and being configured to engage said line cord strain relief element within said cavity in such a manner as to urge said portion of said line cord strain relief element wider than said tunnel into sealing engagement with said external surface of said communication device.

14. A strain relief attachment according to claim 13, wherein said strain relief element has a tapered surface so that insertion of said line cord retention plug causes said line cord strain relief element to be drawn into said communication device.

15. A strain relief attachment according to claim 13, wherein said battery compartment has a geometry that is adjustable so as to accommodate different sized batteries.

16. A strain relief attachment according to claim 13, wherein said battery compartment comprises a first wall member supporting a first plurality of conductors thereon, and wherein a second wall member supporting a second plurality of conductors thereon, and wherein said first and second wall members are moveable relative to each other, so as to define respective different separations therebetween corresponding to dimensions of different sized batteries.

* * * * *